(12) United States Patent
Shen

(10) Patent No.: US 10,780,549 B2
(45) Date of Patent: Sep. 22, 2020

(54) POLISHING DEVICE

(71) Applicant: Wuhan China Star Optoelectronics Semiconductor Display Technology Co., Ltd., Wuhan, Hubei (CN)

(72) Inventor: Haiyang Shen, Guangdong (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 352 days.

(21) Appl. No.: 15/951,674

(22) Filed: Apr. 12, 2018

(65) Prior Publication Data

US 2019/0193246 A1    Jun. 27, 2019

Related U.S. Application Data

(63) Continuation of application No. PCT/CN2018/073838, filed on Jan. 23, 2018.

(30) Foreign Application Priority Data

Dec. 26, 2017    (CN) .......................... 2017 1 1431372

(51) Int. Cl.
*B24B 55/02*    (2006.01)
*B24B 55/03*    (2006.01)
(Continued)

(52) U.S. Cl.
CPC .............. *B24B 55/02* (2013.01); *B23Q 11/10* (2013.01); *B23Q 11/1015* (2013.01); *B24B 7/07* (2013.01);
(Continued)

(58) Field of Classification Search
CPC ......... B24B 55/02; B24B 55/03; B24B 55/06; B24B 55/12; B24B 37/015; B24B 49/14;
(Continued)

(56) References Cited

U.S. PATENT DOCUMENTS 2,380,332 A * 7/1945 Scheer ..................... B24D 5/10
                                                    451/450
3,739,535 A * 6/1973 Fournier ................. B24B 21/14
                                                    451/488
(Continued)

FOREIGN PATENT DOCUMENTS

CN         102959626 A     3/2013
CN         203592387 U     5/2014
(Continued)

*Primary Examiner* — Eileen P Morgan
(74) *Attorney, Agent, or Firm* — Hemisphere Law, PLLC; Zhigang Ma

(57) ABSTRACT

A polishing device configured to polish a glass substrate is disclosed, including a polishing wheel fixedly arranged, a cooling pipe, and a movable platform. The polishing wheel has an outer peripheral polishing surface, the glass substrate is placed on the platform and is driven by the platform to move so as to make the outer peripheral polishing surface polish the predetermined polishing surface of the glass substrate; the polishing wheel further has a chamber, and the cooling pipe containing a coolant is disposed in the chamber to decrease a temperature of the chamber and then to make temperatures of the outer peripheral polishing surface and the predetermined polishing surface during polishing is lower than a preset temperature. The disclosure solves the problem of high polishing temperature of the polishing wheel and the glass substrate, thereby enhancing the service life of the polishing wheel and the yield of the glass substrate.

7 Claims, 2 Drawing Sheets

(51) Int. Cl.
  *B24B 55/06* (2006.01)
  *B24B 55/12* (2006.01)
  *B24B 49/14* (2006.01)
  *B24B 37/015* (2012.01)
  *B23Q 11/10* (2006.01)
  *B24B 7/07* (2006.01)

(52) U.S. Cl.
  CPC ............ *B24B 37/015* (2013.01); *B24B 49/14* (2013.01); *B24B 55/03* (2013.01); *B24B 55/06* (2013.01); *B24B 55/12* (2013.01)

(58) Field of Classification Search
  CPC . B23Q 11/10; B23Q 11/1015; B23Q 11/1023; B25B 11/005; B24D 5/10
  USPC ...... 451/7, 53, 231, 242, 388, 449, 456, 488
  See application file for complete search history.

(56) References Cited

U.S. PATENT DOCUMENTS

| | | | | |
|---|---|---|---|---|
| 4,597,228 | A * | 7/1986 | Koyama | B24B 7/228 451/289 |
| 5,993,297 | A * | 11/1999 | Hyatt | B24B 55/02 451/450 |
| 6,358,119 | B1 * | 3/2002 | Shih | B24B 37/015 451/36 |
| 7,654,887 | B2 * | 2/2010 | Ishikawa | B24B 37/30 451/388 |
| 2004/0176017 | A1 * | 9/2004 | Zelenski | B24B 37/08 451/41 |
| 2006/0040584 | A1 * | 2/2006 | Ray | B24B 1/00 451/5 |
| 2007/0077132 | A1 * | 4/2007 | Beckington | B23B 31/02 408/61 |
| 2007/0190915 | A1 * | 8/2007 | Schrottner | B24D 5/10 451/451 |
| 2010/0270757 | A1 * | 10/2010 | Beckington | B23C 5/10 279/20 |
| 2012/0093604 | A1 * | 4/2012 | Rozzi | B23B 51/06 409/136 |
| 2014/0366692 | A1 * | 12/2014 | Schmidt | B23B 25/00 82/152 |
| 2015/0037110 | A1 * | 2/2015 | Wunderlich | B23Q 11/1053 408/1 R |
| 2015/0078851 | A1 * | 3/2015 | Liepelt | B23Q 11/1015 409/38 |
| 2017/0014967 | A1 * | 1/2017 | Xie | B24B 49/14 |

FOREIGN PATENT DOCUMENTS

| | | |
|---|---|---|
| CN | 103945985 A | 7/2014 |
| CN | 204036198 U | 12/2014 |
| CN | 105150106 A | 12/2015 |
| CN | 105666330 A | 6/2016 |
| CN | 205325370 U | 6/2016 |
| CN | 206084655 U | 4/2017 |
| CN | 206500956 U | 9/2017 |
| CN | 107322496 A | 11/2017 |
| CN | 206605335 U | 11/2017 |
| JP | H10-118940 A | 5/1998 |
| JP | 2016068181 A | 5/2016 |

* cited by examiner

POLISHING DEVICE

RELATED APPLICATIONS

This application is a continuation application of PCT Patent Application No. PCT/CN2018/073838, filed Jan. 23, 2018, which claims the priority benefit of Chinese Patent Application No. 201711431372.X, filed Dec. 26, 2017, which is herein incorporated by reference in its entirety.

FIELD OF THE DISCLOSURE

The disclosure relates to the technical field of machining, in particular to a polishing device.

BACKGROUND

At present, glass substrates need to be deburred, chamfered, and other finishing processes by a polishing device after being formed. Most existing polishing machines use a motor to drive the polishing wheel to rotate so that the glass substrate collides with the polishing wheel and rubs to achieve the polishing purpose. However, during the collision and friction between the polishing wheel and the glass substrate, the temperature of the polishing wheel and the glass substrate will increase, which affects the service life of the polishing wheel and the yield of the glass substrate.

SUMMARY

An object of the disclosure is to provide a polishing device to solve the technical problem of high polishing temperature of a polishing wheel and a glass substrate.

The disclosure provides a polishing device configured to polish a glass substrate, including a polishing wheel fixedly arranged, a cooling pipe, and a platform having a movable function, the glass substrate is placed on the platform, the polishing wheel has an outer peripheral polishing surface, and the platform drives the glass substrate to move so as to make the outer peripheral polishing surface of the polishing wheel polish the predetermined polishing surface of the glass substrate; the polishing wheel further has a chamber, and the cooling pipe containing a coolant is disposed in the chamber to decrease a temperature of the chamber and then to make a temperature of the outer peripheral polishing surface of the polishing wheel and a temperature of the predetermined polishing surface of the glass substrate during a polishing process is lower than a preset temperature.

The polishing device includes a collection device configured to collect glass scraps generated during the polishing process of the glass substrate.

The polishing device includes a vacuum suction pipe connected to the collection device, and the glass scraps are collected in the collection device through the vacuum suction pipe.

The polishing wheel is connected with a fixing shaft, the fixing shaft penetrates through the chamber and is fixed to the polishing wheel, the cooling pipe is a flexible hose, and the cooling pipe is wound around the fixing shaft.

The cooling pipe includes a liquid inlet pipe, a liquid discharge pipe, and a spiral pipe connecting the liquid inlet pipe and the liquid discharge pipe, the liquid inlet pipe and the liquid discharge pipe are exposed outside the chamber, and the spiral pipe is wound around the fixing shaft disposed in the chamber.

A control valve is disposed on the liquid inlet pipe, and the control valve is configured to control a flow rate of the coolant entering the cooling pipe so as to control the temperature of the polishing wheel.

The polishing device includes a temperature sensor configured to measure the temperature of the outer peripheral polishing surface of the polishing wheel during polishing or to measure the temperature of the predetermined polishing surface of the glass substrate during polishing.

A vacuum suction hole is disposed on the platform, and the vacuum suction hole is configured to suck the glass substrate on the platform.

The polishing device includes a vacuum device, the vacuum suction pipe and the vacuum suction hole are connected to the vacuum device, and the vacuum device is configured to vacuum the vacuum suction pipe so as to collect the glass scraps in the collection device through the vacuum suction pipe and configured to suck the glass substrate on the platform through the vacuum suction hole.

A driving component is connected to the platform, and the driving component drives the platform to move.

In summary, the cooling pipe of the polishing device of the disclosure contains a coolant, and the cooling pipe is disposed in the chamber to realize the conduction of heat generated during the polishing process of the polishing wheel and the glass substrate to the cooling pipe, and the coolant flowing through the cooling pipe realizes that the heat conducted to the cooling pipe is taken away and is conducted to the outside, the polishing temperature of the polishing wheel and the glass substrate is reduced, thereby improving the service life of the polishing wheel and improving the yield of the glass substrate.

BRIEF DESCRIPTION OF THE DRAWINGS

In order to illustrate technical schemes of the disclosure or the prior art more clearly, the following section briefly introduces drawings used to describe the embodiments and prior art. Obviously, the drawing in the following descriptions is just some embodiments of the disclosure. The ordinary person in the related art can acquire the other drawings according to these drawings without offering creative effort.

DETAILED DESCRIPTION OF PREFERRED EMBODIMENTS

Figure 1:
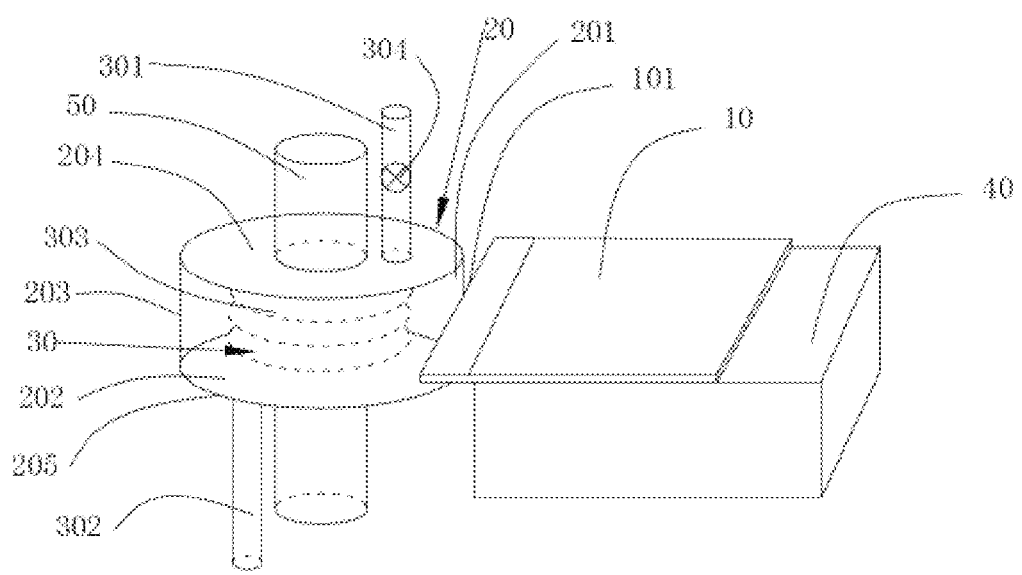
FIG. 1 is a schematic structural view of a polishing device according to an embodiment of the disclosure, which includes a glass substrate.
Figure 2:
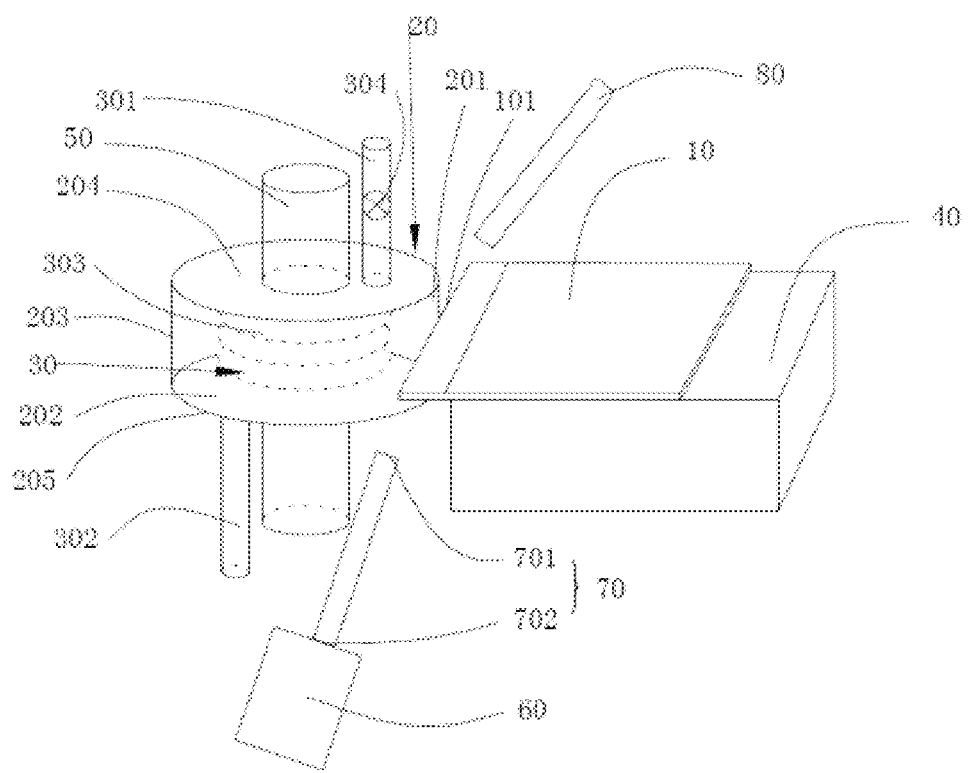
FIG. 2 is a schematic structural view of the polishing device of FIG. 1, which includes a glass substrate, and the polishing device is installed with a vacuum suction pipe, a collection device, and a temperature sensor.

Referring to FIG. 1, the disclosure provides a polishing device configured to polish a glass substrate 10, including a polishing wheel 20 fixedly arranged, a cooling pipe 30, and a platform 40 having a movable function; the glass substrate 10 is placed on the platform 40, the polishing wheel 20 has an outer periphery polishing surface 201, and the platform 40 drives the glass substrate 10 to move so as to make the outer periphery polishing surface 201 of the polishing wheel 20 polish the predetermined polishing surface 101 of the glass substrate 10. The polishing wheel 20 further has a chamber 202. The cooling pipe 30 containing a coolant is disposed in the chamber 202 to decrease the temperature of the chamber 202 and then to make a temperature of the outer peripheral polishing surface 201 of the polishing wheel and a temperature of the predetermined polishing surface 101 of the glass substrate during the polishing process is lower than a preset temperature.

A vacuum suction hole is disposed on the platform 40, and the vacuum suction hole is configured to suck the glass substrate 10 on the platform 40. A driving component is connected to the platform 40, and the driving component is configured to drive the platform 40 to move and then to drive the glass substrate 10 placed on the platform 40 to move so as to make the polishing wheel 20 polish the glass substrate 10 during the movement of the glass substrate 10. The driving component includes a cylinder and a motor. In this embodiment, the preset temperature is the melting point of the glass substrate 10, that is, it is ensured that the glass substrate 10 does not melt during the polishing process. Of course, when the preset temperature is lower than the melting point of the glass substrate 10, it can be further ensured that the glass substrate 10 remains in a solid state during the polishing process.

The cooling pipe 30 of the polishing device of the disclosure contains a coolant, and the cooling pipe 30 is disposed in the chamber 202 to realize the conduction of heat generated during the polishing process of the polishing wheel 20 and the glass substrate 10 to the cooling pipe 30, and the coolant flowing through the cooling pipe 30 realizes that the heat conducted to the cooling pipe 30 is taken away and conducted to the outside. The disclosure avoids adopting a mode of spraying cooling water to the polishing wheel 20 to reduce the temperature of the polishing wheel 20 during the polishing process and further avoids the water stains caused by the mode of spraying cooling water contaminating the product and the water stains are thrown out at a high speed, the service life of the polishing wheel 20 is raised, the yield of the glass substrate 10 is increased, the production cost added to eliminate the influence of water stains is reduced, and the production cycle of the product is shortened.

In this embodiment, the cylindrical wheel of the polishing wheel 20 has a chamber 202. The polishing wheel 20 includes a sidewall 203, a top wall 204, and a bottom wall 205 connected to two opposite ends of the sidewall 203. The sidewall 203 includes the outer peripheral polishing surface 201 and the chamber 202 enclosed by the sidewall 203.

In this embodiment, the polishing wheel 20 is connected to a fixing shaft 50, the fixing shaft 50 penetrates through the chamber 202 and is fixed to the polishing wheel 20, the cooling pipe 30 is a flexible hose, and the cooling pipe 30 is wound around the fixing shaft 50.

The cooling pipe 30 includes a liquid inlet pipe 301, a liquid drain pipe 302, and a spiral pipe 303 connecting the liquid inlet pipe 301 and the liquid drain pipe 302. The liquid inlet pipe 301 and the liquid drain pipe 302 are exposed outside the chamber 202, the spiral pipe 303 is wound around the fixing shaft 50 disposed in the chamber 202. Specifically, the top wall 204 includes a first through hole (not shown in the figure) and a second through hole (not shown in the figure). The liquid inlet pipe 301 passes through the first through hole and the second through hole to communicate with the spiral pipe 303. The bottom wall 205 includes a third through hole (not shown in the figure) and a fourth through hole (not shown in the figure). The liquid drain pipe 302 passes through the third through hole to communicate with the spiral pipe 303. The second through hole is collinear with the central axis of the fourth through hole, and the opening areas of the second through hole and the fourth through hole are equal to the cross-sectional area of the fixing shaft 50, that is, the second through hole and the fourth through hole are configured to make the fixing shaft 50 pass through, and then the fixing shaft 50 passes through the second through hole and the fourth through hole to be fixed to the polishing wheel. The fixing of the fixing shaft 50 and the polishing wheel 20 in the disclosure enables the spiral pipe 303 to be firmly wound around the fixing shaft 50 during polishing. The winding of the spiral pipe 303 around the fixing shaft 50 realizes to increase the length of the cooling pipe 30, that is, to increase the dwell time of the coolant in the cooling pipe and to increase the contact area between the coolant and the cooling pipe 30, thereby enhancing the cooling effect of the coolant on the polishing wheel 20.

The liquid inlet pipe 301 is disposed with a control valve 304, the control valve 304 is configured to control the cooling fluid flow entering into the cooling pipe 30, thereby controlling the temperature of the polishing wheel 20. Specifically, during the polishing of the glass substrate 10 by the polishing wheel 20, the control valve 304 controls the conduction of the liquid inlet pipe 301 and controls the size of the cross-sectional area of the liquid inlet pipe 301 to be conductive, and further controls the flow rate of the coolant entering the cooling pipe 30 to further control the temperature of the polishing wheel 20.

In the present embodiment, the polishing device includes a collection device 60, the collection device 60 is configured to collect the glass scraps generated during the polishing process of the glass substrate 10. Specifically, during the polishing process of the polishing wheel 20 polishing the glass substrate 10, the glass substrate 10 produce glass scraps, the collection device 60 collects the glass scraps so as to timely process and remove the glass scraps, thereby preventing the glass scraps from being thrown onto the glass substrate by the polishing wheel 20 and further preventing the glass scraps from causing the damage of the glass substrate 10.

The polishing device includes a vacuum suction pipe 70, the vacuum suction pipe 70 is connected to the collecting means 60, the glass scraps is collected in the collection device 60 through the vacuum suction pipe 70. Specifically, the vacuum suction pipe 70 includes a first end 701 and a second end 702 opposite to the first end 701. The first end 701 faces the predetermined polishing surface 101 of the glass substrate 10, and the second end 702 is connected to the collection device 60. The glass scraps generated by the glass substrate 10 enter the vacuum suction pipe 70 through the first end 701 and enter the collection device 60 through the second end 702.

The polishing device includes a vacuum device, the vacuum suction pipe 70 and the vacuum suction hole are connected to the vacuum device, the vacuum device is configured to vacuum the vacuum suction pipe 70 and further to make the glass scraps to be collected in the collection device 60 through the vacuum suction pipe 70 and is configured to suck the glass substrate 10 on the platform 40 through the vacuum suction pipe 70. Specifically, the vacuum device vacuums the vacuum suction hole to firmly suck the glass substrate 10 onto the platform 40, so that during the movement of the platform 40, the glass substrate 10 is not moved to achieve precise control of the polishing size of the predetermined polishing surface 101. The vacuum device vacuums the vacuum suction pipe 70 so as to collect the glass scraps into the collection device 60 through the vacuum suction pipe 70.

The polishing device includes a temperature sensor 80, the temperature sensor 80 is configured to measure the temperature of the outer peripheral polishing surface 201 of the polishing wheel 20 during polishing or to measure the temperature of the predetermined polishing surface 101 of the glass substrate 10 during polishing. Specifically, during the process of polishing the glass substrate 10 by the polishing wheel 20, the temperature sensor 80 senses the temperatures at the positions of the outer periphery polishing surface 201 of the polishing wheel 20 and the predetermined polishing surface 101 of the glass substrate 10 and displays the temperature.

The polishing device includes a control device, the control device controls activation and deactivation of the vacuum device, the temperature sensor 80, and the driving component. Specifically, when the polishing wheel 20 polishes the glass substrate 10, the control device controls the vacuum device, the temperature sensor 80, and the driving component to be activated; when the polishing wheel 20 finishes polishing the glass substrate 10, the control device controls the vacuum device, the temperature sensor 80, and the driving component to be closed.

In this embodiment, when the polishing wheel 20 polishes the glass substrate 10, the control device controls the vacuum device, the temperature sensor 80 and the driving component to be activated, and the glass substrate 10 is sucked on the platform 40 through the vacuum suction hole, the control valve 304 controls the liquid inlet pipe 301 to be conductive and controls the cross-sectional area conducted by the liquid inlet pipe 301, and the coolant passes through the cooling pipe 30 into the chamber 202 of the polishing wheel 20. The platform 40 drives the glass substrate 10 to move, and the outer peripheral polishing surface 201 of the polishing wheel 20 polishes the predetermined polishing surface 101 of the glass substrate 10. The collection device 60 collects glass scraps generated by the glass substrate 10 through the vacuum suction pipe 70. The temperature sensor 80 senses the temperature of the polishing position of the outer periphery polishing surface 201 of the polishing wheel 20 and the predetermined polishing surface 101 of the glass substrate 10 and displays the temperature. When the temperature displayed by the temperature sensor exceeds the preset temperature, the control valve 304 controls the cross-sectional area conducted by the liquid inlet pipe 301 to increase, and further increases the liquid coolant entering the cooling pipe 30 so as to make the temperature at the polishing position of the outer circumferential polishing surface 201 of the polishing wheel 20 and the surface to be polished 101 of the glass substrate 10 lower than the preset temperature. When the polishing wheel 20 finishes polishing the glass substrate 10, the control device controls the vacuum device, the temperature sensor 80, and the driving component to be closed.

The cooling pipe 30 of the disclosure contains a coolant, and the cooling pipe 30 is disposed in the chamber 202 to realize the conduction of heat generated during the polishing process of the polishing wheel 20 and the glass substrate 10 to the outside, so as to avoid adopting a mode of spraying cooling water to the polishing wheel 20 to reduce the temperature of the polishing wheel 20 during the polishing process and further avoid the water stains caused by the mode of spraying cooling water contaminating the product and the water stains are thrown out at a high speed, thereby achieving the technical effect of polishing without water, and the life of the polishing wheel 20 is raised, the yield of the glass substrate 10 is increased, the production cost added to eliminate the influence of water stains is reduced, and the production cycle of the product is shortened. The vacuum suction pipe 70 of the disclosure is connected to the collection device 60. The glass scraps generated during the polishing process of the glass substrate 10 are collected in the collection device 60 through the vacuum suction pipe 70, so as to timely process and remove the glass scraps, thereby preventing the glass scraps from being thrown onto the glass substrate by the polishing wheel 20 and further preventing the glass scraps from causing the damage of the glass substrate 10.

The above is only the preferred embodiments of the disclosure, and certainly cannot be used to limit the scope of the disclosure. Those skilled in the art may understand that all or part of the processes of the above embodiments may be implemented and that the claims of the disclosure equivalent changes are still within the scope of the disclosure.

What is claimed is:

1. A polishing device, configured to polish a glass substrate, comprising:
    a polishing wheel;
    a cooling pipe; and
    a platform for placing the glass substrate, wherein the platform is driven to move so that the glass substrate placed on the platform is moved toward and polished by the polishing wheel;
    wherein the polishing wheel has an outer peripheral polishing surface, the platform is driven to move the glass substrate so as to make the outer peripheral polishing surface of the polishing wheel polish a predetermined polishing surface of the glass substrate, the polishing wheel further has a chamber, and the cooling pipe containing a coolant is disposed in the chamber to decrease a temperature of the chamber such that, during a polishing process, a temperature of the outer peripheral polishing surface of the polishing wheel and a temperature of the predetermined polishing surface of the glass substrate is lower than a preset temperature;
    wherein the polishing device comprises a collection device and a vacuum suction pipe connected to the collection device, and glass scraps generated during the polishing process of the glass substrate are collected in the collection device through the vacuum suction pipe;
    wherein a fixing shaft is connected to the polishing wheel, the fixing shaft penetrates through the chamber and is fixed to the polishing wheel, the cooling pipe is a flexible hose, and the cooling pipe is wound around the fixing shaft.

2. The polishing device according to claim 1, wherein the cooling pipe comprises a liquid inlet pipe, a liquid discharge pipe, and a spiral pipe connecting the liquid inlet pipe and the liquid discharge pipe, the liquid inlet pipe and the liquid discharge pipe are exposed outside the chamber, and the spiral pipe is wound around the fixing shaft disposed in the chamber.

3. The polishing device according to claim 2, wherein a control valve is disposed on the liquid inlet pipe, and the control valve is configured to control a flow rate of the coolant entering the cooling pipe so as to control a temperature of the polishing wheel.

4. The polishing device according to claim 3, wherein the polishing device comprises a temperature sensor configured to measure the temperature of the outer peripheral polishing surface of the polishing wheel during polishing or to measure the temperature of the predetermined polishing surface of the glass substrate during polishing.

5. The polishing device according to claim 4, wherein a vacuum suction hole is disposed on the platform, and the vacuum suction hole is configured to suck the glass substrate on the platform.

6. The polishing device according to claim 5, wherein the polishing device comprises a vacuum device, the vacuum suction pipe and the vacuum suction hole are connected to the vacuum device, and the vacuum device is configured to vacuum the vacuum suction pipe so as to collect the glass scraps into the collection device through the vacuum suction pipe and configured to suck the glass substrate on the platform through the vacuum suction hole.

7. The polishing device according to claim 6, wherein a driving component is connected to the platform, and the driving component drives the platform to move.

\* \* \* \* \*